(12) United States Patent
Ferguson et al.

(10) Patent No.: US 10,150,250 B2
(45) Date of Patent: Dec. 11, 2018

(54) MOULDED PLASTIC ARTICLES WITH CONTACT BETWEEN TWO DISSIMILAR PLASTICS

(71) Applicants: Gary Wayne Ferguson, Cape Town (ZA); John Peter Searle, Cape Town (ZA)

(72) Inventors: Gary Wayne Ferguson, Cape Town (ZA); John Peter Searle, Cape Town (ZA); Keith Wyness, Cape Town (ZA)

(73) Assignees: Gary Wayne Ferguson, Cape Town (ZA); John Peter Searle, Cape Town (ZA)

( * ) Notice: Subject to any disclaimer, the term of this patent is extended or adjusted under 35 U.S.C. 154(b) by 443 days.

(21) Appl. No.: 14/418,520

(22) PCT Filed: Jul. 22, 2013

(86) PCT No.: PCT/IB2013/055996
§ 371 (c)(1),
(2) Date: Jan. 30, 2015

(87) PCT Pub. No.: WO2014/020482
PCT Pub. Date: Feb. 6, 2014

(65) Prior Publication Data
US 2015/0328830 A1 Nov. 19, 2015

(30) Foreign Application Priority Data
Aug. 2, 2012 (ZA) .................................. 2012/05826

(51) Int. Cl.
*B29C 41/06* (2006.01)
*B29C 65/48* (2006.01)
(Continued)

(52) U.S. Cl.
CPC ........ *B29C 65/486* (2013.01); *B29C 37/0082* (2013.01); *B29C 41/003* (2013.01);
(Continued)

(58) Field of Classification Search
CPC .............. B29C 44/129; B29C 37/0078; B29C 37/0082
(Continued)

(56) References Cited

U.S. PATENT DOCUMENTS 3,457,205 A     7/1969  Nonweiler
3,511,738 A  *  5/1970  McGuire ............... B29C 44/129
                                                              156/242
(Continued)

FOREIGN PATENT DOCUMENTS

DE     24 35 510      11/1975
DE     199 24 092     11/2000
(Continued)

OTHER PUBLICATIONS

PCT International Search Report and Written Opinion issued in International Application No. PCT/IB2013/055996, dated Dec. 18, 2013.
(Continued)

*Primary Examiner* — Christina A Johnson
*Assistant Examiner* — Xue H Liu
(74) *Attorney, Agent, or Firm* — Parker Highlander PLLC

(57) ABSTRACT

A plastics molding process is provided in which a first (2) and a second plastic part (3) are molded such that a contact surface is formed between the two parts. The first part (2) is molded firstly and, while at least the contact surface is still in a liquid or plastic state, an attachment promoting powder (16) that is compatible with, and has the characteristic of attaching to, the plastic of the first part (2), is applied to it. Thereafter, the second part (3) is molded so as to contact the
(Continued)

first part at the contact surfaces such that as it solidifies, it attaches to the attachment promoting powder (16) and thereby to the first part (2). The second part (3) may be a plastic foam filling for a hollow first part (2). The attachment promoting powder (16) may be a suitable grade of diatomaceous earth or a natural or synthetic equivalent.

8 Claims, 3 Drawing Sheets

(51) Int. Cl.
  B29C 65/70    (2006.01)
  B29C 65/52    (2006.01)
  B29C 65/54    (2006.01)
  B29C 65/00    (2006.01)
  B32B 7/04     (2006.01)
  B29C 41/22    (2006.01)
  C08L 75/04    (2006.01)
  B29C 41/00    (2006.01)
  B32B 27/06    (2006.01)
  B32B 27/32    (2006.01)
  B29C 37/00    (2006.01)
  B29C 44/06    (2006.01)
  B29C 44/08    (2006.01)
  B29K 23/00    (2006.01)
  B29L 9/00     (2006.01)
  C08G 101/00   (2006.01)
  B29L 24/00    (2006.01)
  B29K 75/00    (2006.01)
  B29K 105/04   (2006.01)
  B29C 44/18    (2006.01)

(52) U.S. Cl.
  CPC .............. *B29C 41/06* (2013.01); *B29C 41/22* (2013.01); *B29C 44/06* (2013.01); *B29C 44/08* (2013.01); *B29C 65/522* (2013.01); *B29C 65/54* (2013.01); *B29C 65/70* (2013.01); *B29C 66/01* (2013.01); *B29C 66/727* (2013.01); *B32B 7/04* (2013.01); *B32B 27/065* (2013.01); *B32B 27/32* (2013.01); *C08L 75/04* (2013.01); *B29C 44/18* (2013.01); *B29K 2023/00* (2013.01); *B29K 2075/00* (2013.01); *B29K 2105/04* (2013.01); *B29K 2223/0625* (2013.01); *B29L 2009/00* (2013.01); *B29L 2024/00* (2013.01); *B32B 2266/0278* (2013.01); *B32B 2266/08* (2013.01); *C08G 2101/005* (2013.01); *C08G 2101/0083* (2013.01)

(58) Field of Classification Search
  USPC .......................................... 264/259, 265, 267
  See application file for complete search history.

(56)        References Cited

U.S. PATENT DOCUMENTS

| 3,700,514 A | | 10/1972 | Zito, Jr. | |
| 5,275,860 A | * | 1/1994 | D'Luzansky | ......... B29C 44/129 114/357 |
| 6,428,895 B1 | | 8/2002 | Reihs et al. | |
| 2008/0145582 A1 | * | 6/2008 | Spence | ................. B29C 41/003 428/36.6 |

FOREIGN PATENT DOCUMENTS

| GB | 991909 | 5/1965 |
| JP | 2933519 | 8/1999 |
| WO | WO 2006-000770 | 1/2006 |

OTHER PUBLICATIONS

Office Action issued in European Application No. 13826378.5, dated May 11, 2016.

* cited by examiner

MOULDED PLASTIC ARTICLES WITH
CONTACT BETWEEN TWO DISSIMILAR
PLASTICS

This application is a national phase application under 35 U.S.C. § 371 of International Application No. PCT/IB2013/055996, filed Jul. 22, 2013, which claims benefit of and priority to South African Application No. 2012/05826, filed Aug. 2, 2012. The entire text of each of the above referenced disclosures is specifically incorporated herein by reference.

FIELD OF THE INVENTION

This invention relates to moulded plastic articles wherein one type of plastic material has a surface in contact with a surface of a different plastic material such as, for example, in the instance of a thermoplastic material and a thermosetting plastic material.

More particularly, but not exclusively, the invention is concerned with the attachment of a thermoplastic material to a thermosetting plastic material over a contact surface area, the thermoplastic material typically being a robust wear resistant material such as a polyethylene or polypropylene, and the thermosetting plastic material providing other desirable properties typically selected from those of lightness, rigidity, thermal insulation, void filling and attachment. The latter would typically be a foam plastic material, such as a foam polyurethane.

The invention is particularly, but not exclusively, concerned with rotational moulded thermoplastic containers that have cavity walls wherein the cavity is filled with a thermosetting foam plastic insulating material.

BACKGROUND TO THE INVENTION

Thermoplastic materials are commonly polyolefins such as polyethylene and polypropylene and become pliable or mouldable above a specific temperature, and return to a solid state upon cooling. They can withstand multiple occasions of heating and re-shaping by extrusion, injection moulding, blow moulding, and rotational moulding methods, which makes them recyclable.

Polyethylene and polypropylene possess many desirable characteristics including those of inertness to most chemicals and solvents at ordinary temperature, toughness and flexibility. They are generally poor conductors of electricity.

Thermosetting plastics, on the other hand, are polymer materials that cure by forming irreversible chemical bonds with curing being promoted using heat; a chemical reaction; or irradiation. Thermosetting materials are either moulded into their final form, or used as adhesives. Many thermosetting plastics are foamed as they cure such as the well known polyurethane foam material.

In applications in which a robust impact and wear resistant plastic shell is filled with a foam plastic thermal insulating material, such as in the instance of cold boxes and delivery containers for refrigerated or frozen goods, the most cost effective physical properties for a plastic shell are typically provided by polyolefin plastics which may be any one of a variety of different grades of polyethylene and polypropylene. The shell is typically made by rotational moulding. The rotational moulding process is well suited to the manufacture of double-walled containers, particularly deep containers, such as insulated cold boxes and delivery containers. Such a rotation moulding process typically involves four stages, namely charging the mould with thermoplastic powder; heating and fusing the powder whilst rotating the mould about two axes; cooling the mould during continued rotation; and de-moulding.

Polyolefin plastics, and in particular the polyethylene group that includes those known as linear low density polyethylene (LLDPE), low-density polyethylene (LDPE), medium density polyethylene (MDPE) and high-density polyethylene (HDPE) reportedly dominate the market for rotationally moulded parts with LLDPE reportedly being the most popular by an appreciable margin.

While the polyolefin plastics generally have good impact and chemical resistance, the properties of strength and stiffness of LLDPE is known to be rather temperature dependent. As a result and especially coupled with a high coefficient of expansion, an LLDPE rotational moulding may show some distortion or bulge when exposed to intense sunshine or other heat source. LLDPE is inherently flexible and possesses limited stiffness that has led mould designers to use an array of features such as indentations, ribbing, angles and corrugations to add rigidity and strength to a moulded product.

The filling of hollow double-walled containers with plastic foam is a cost effective method of adding stiffness, strength and rigidity to a rotational moulded product. The foam core provides the additional benefits of shape retention as well as excellent thermal insulation and buoyancy. Polyurethane foam is frequently the foam-type of choice for post-moulding applications. It is a low density, rigid, heat insulating foam that has exceptional thermal properties and possesses a low coefficient of thermal expansion. Polyurethane foam may be applied to a cavity to be filled in a variety of different ways that include the use of a measured and mixed, two-part liquid form which expands into a mass of bubbles and cures quickly.

Unfortunately, the desirable properties of LLDPE as an outer skin and the desirable properties of polyurethane foam as a general use, wide application heat insulating filler do lead to difficulties in causing the one to attach to the other to an adequate extent. This phenomenon is attributed to the fact that the polyurethane foam tends to form a smooth skin at the interface between its cellular core structure and the LLDPE substrate as it does when such a foam is cured directly in a mould treated with a release agent.

One problem associated with inadequate attachment is that the outer skin or shell can move independently of the foam core and due to their varying coefficients of thermal expansion, expansion of the shell can take place independently of the foam. From a structural point of view there is no way in which a shear force can be reliably transferred from the shell to the foam as would be desirable in a sound sandwich construction composite.

Whilst polyurethane foam, a popular thermosetting filler material, may have generally high levels of attachment with respect to a wide spectrum of substrates and other plastic materials, it is not compatible with LLDPE and its bond with this thermoplastic is very weak. Bad attachment and incompatibility of polyethylene with other materials such as pigments, paints, and other polymers has earned it the classification of a 'hard-to-bond material'.

It is common practice in the plastics industry that hard-to-bond materials be subjected to surface modification (treatment or preparation) operations to enhance their attachment potential. Current surface modification methods include heat, chemical, priming and physical treatments. All are designed to increase the reactivity and roughness of the surface of the plastic. However, preparing the internal surface of rotational moulded products for polyurethane foaming by such post-moulding secondary operations gives rise to challenges in terms of associated extra costs, adaptability, practical implementation, convenience and safety.

In instances in which the surface to be modified is suitably accessible, surface modification methods include fluorination using fluorine gas with short exposures with the disadvantage that fluorine gas is highly toxic and corrosive and can be fatal if inhaled; corona discharge and plasma treatment with an accompanying sizeable investment in capital equipment or the outsourcing of treatment; flame treatment that is mostly used on polyolefin sheet materials and smaller simple shapes of items; primers in which a reactive species is dissolved and applied to a surface using a brush or spray; chemical etching such as chromic acid etching which can be hazardous and results in its use on a limited basis; and surface roughening that can be accomplished by abrasion, grit blasting and etching but has accompanying dust and health hazards.

Various other methods of surface modification are more appropriate to an enclosed surface such as the inner surface of a rotational moulding, and may involve charging the mould with a combination of powder grades to promote an oxidized internal skin to the thermoplastic shell in order to encourage adequate attachment to a filling of thermosetting plastic that is typically polyurethane foam. However, there may be a likelihood of producing a moulding with an impaired outer skin or weakened structure.

The addition of other particles of non polymer grit such as steel, aluminium, ground nut shell and other foreign materials to the rotomoulding cycle with the polymer charge is also a possibility. The particles become imbedded in the LDPE substrate and protrude out of it to present a keyed surface for attachment to the plastic foam. The downside of this method is the likelihood of particles protruding through the good surface and impairing same and the embedded foreign particles may weaken the LLDPE skin particularly where there is a concentration of foreign matter.

Another technique is for the moulding process to be stopped short of fully melting the LLDPE powder charge in the mould so that the powder is not fully melted at the inner surface which remains rough and porous and offers better mechanical grip for improved polyurethane foam attachment. This technique is difficult to control because rotational moulding is affected by many factors including ambient temperature. An excessively "under-cooked" product will have impaired strength and may be rejected. A perfectly "under-cooked" product may require an excessive charge size and therefore the product may cost and weigh more than necessary.

A more recent technique is to charge the mould with plasma treated powders and granules to mould an item with an attachment enhanced inner surface. The technology required to undertake the plasma treatment is confined to a few exclusive intellectual property owners and equipment manufacturers There is a need to provide an enhanced method of bonding different plastics materials to each other such as in the case of a thermoplastic to a thermosetting plastic. There is also a need to provide a method of rotational moulding whereby an attachment promoting agent of the two different plastics may be introduced into the moulded item at a specific stage during the moulding cycle.

SUMMARY OF THE INVENTION

In accordance with this invention there is provided a plastics moulding process in which a first part is moulded and a second part is moulded such that at least a part of its surface is in contact with a surface of the first part during the moulding process with the surfaces that are in contact forming contact surfaces between the two parts, the process being characterised in that the first part is moulded firstly and, whilst at least the contact surface is still in a liquid or plastic state, applying to at least a part of the contact surface an attachment promoting powder that is compatible with and has the characteristic of attaching to the thermoplastic first part and thereafter moulding the second part so as to contact the first part at the contact surfaces such that the plastic of the second part attaches, before or as it solidifies, to the attachment promoting powder and thereby to the first part.

Further features of the invention provide for the first part to be thermoplastic material with the second part being thermosetting plastic material and the attachment promoting powder forming a continuous or discontinuous interlayer; for the first part to be made by a rotational moulding process and, when the first part has been substantially formed, the attachment promoting powder is released into the interior of the first part such that it becomes substantially distributed over the contact surface of the first part whilst the inner surface is sufficiently liquid or plastic to attach to the attachment promoting powder; for the second part to be a plastic foam filling for a hollow first part; for the first part to be made of a thermoplastic polyolefin, especially a polyethylene and most particularly a linear or other low-density polyethylene; for the foam filling to be a thermosetting polyurethane; and for the attachment promoting powder to be a suitable grade of diatomaceous earth or a natural or synthetic equivalent.

Whilst the mechanism of the attachment of diatomaceous earth to both of the two dissimilar plastics is not fully understood, it is considered to be a possible result of the fact that diatomaceous earth can absorb or adsorb both a polyolefin while it is in a liquid molten state before solidification takes place and a polyurethane foam while it is still fluid and expanding before solidification takes place. It is postulated that the particles of diatomaceous earth that are known to have qualities of sharpness, unique particle structure and granular interlocking characteristics promote attachment to the molten thermoplastic surface thereby providing good wettability characteristics. It has been further noted that the inertness of diatomaceous earth powder does not appear to compromise the curing and hardening of either plastic type.

The lightness of diatomaceous earth powder enables it to aerate and form a dust cloud within the moulding thus contributing to even distribution on surfaces within a complex-shaped moulding. Also, diatomaceous earth powder that forms the attachment promoting powder interlayer is not prone to breaking down over time and when subjected to reasonable stress levels.

It is at the present stage not known, however, if any other powders will exhibit the same characteristics or if synthetic equivalents may become available.

In order that the invention may be more fully understood one embodiment thereof will now be described with reference to the accompanying drawings.

DETAILED DESCRIPTION WITH REFERENCE TO THE DRAWINGS

Figure 4:
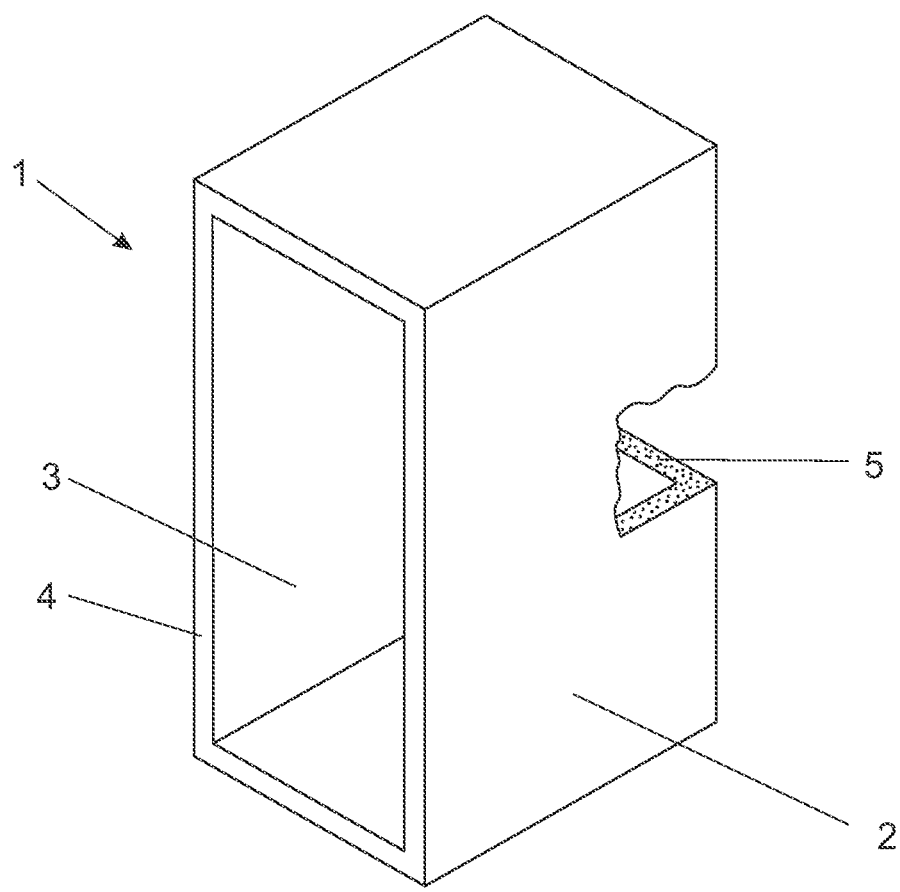
FIG. 4 is a schematic isometric illustration showing the completed moulded product in more detail and with a portion thereof removed; and, FIG. 5 is a very much enlarged sectional view taken through a double wall of the completed moulded product showing the resultant layers thereof.

In this particular embodiment of the invention the moulded plastics product is in the form of a double walled thermally insulated delivery container (1) that has a generally trough shaped outer shell (2) and a somewhat smaller correspondingly shaped inner shell (3) interconnected by means of a surrounding reveal (4) (see FIG. 4). The double walled container is made of a suitable grade of thermoplastic polyethylene material and, in this particular instance; it is made of a linear low-density polyethylene (LLDPE). The space between the walls is filled with a thermosetting heat insulating foam polyurethane material (5).

Figure 1:
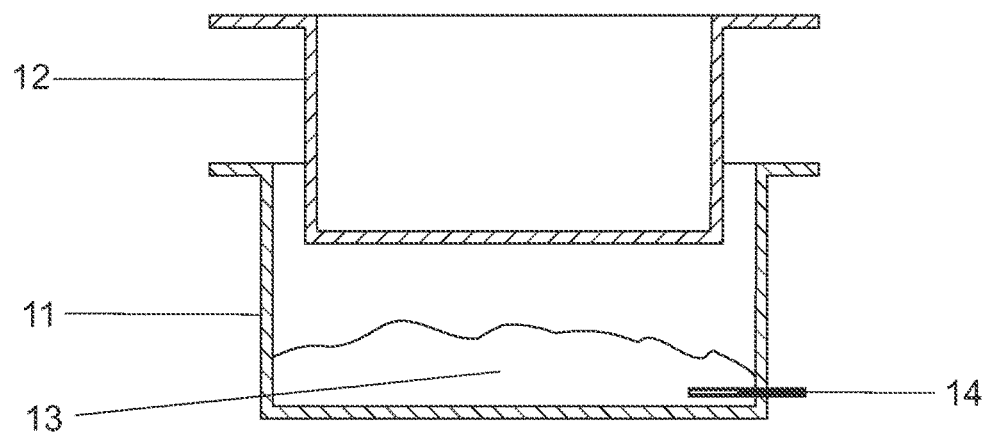
FIG. 1 is a diagrammatic sectional illustration showing two mould halves partially assembled in readiness for moulding.
Figure 2:
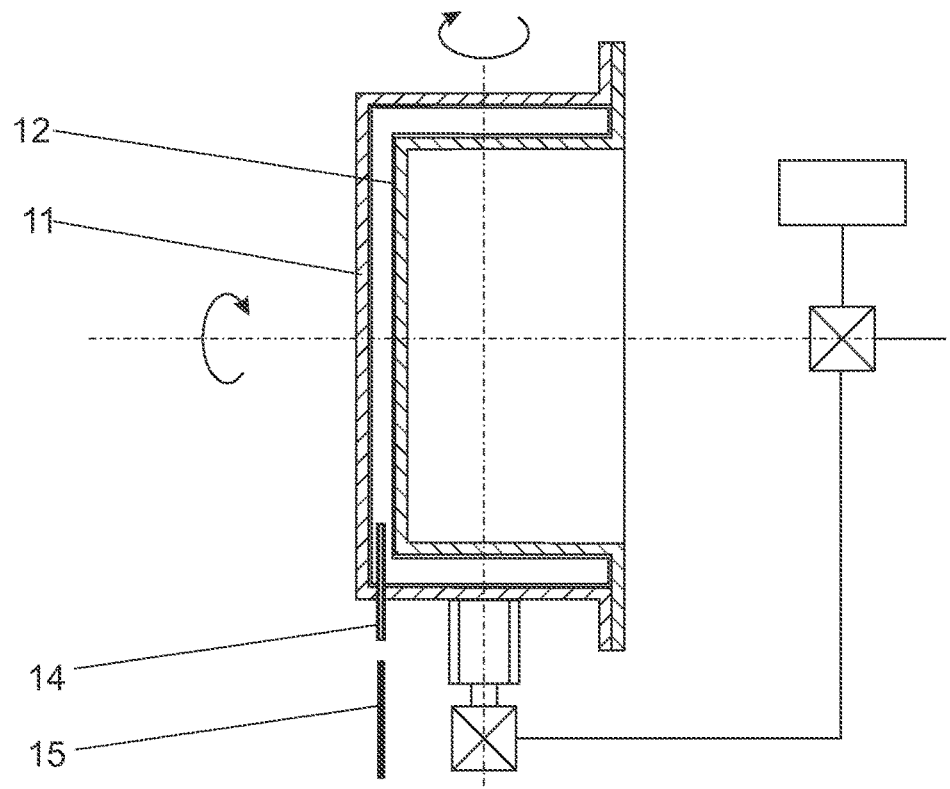
FIG. 2 is a diagrammatic sectional illustration of the assembled mould as installed on a rotational moulding apparatus.
Figure 3:
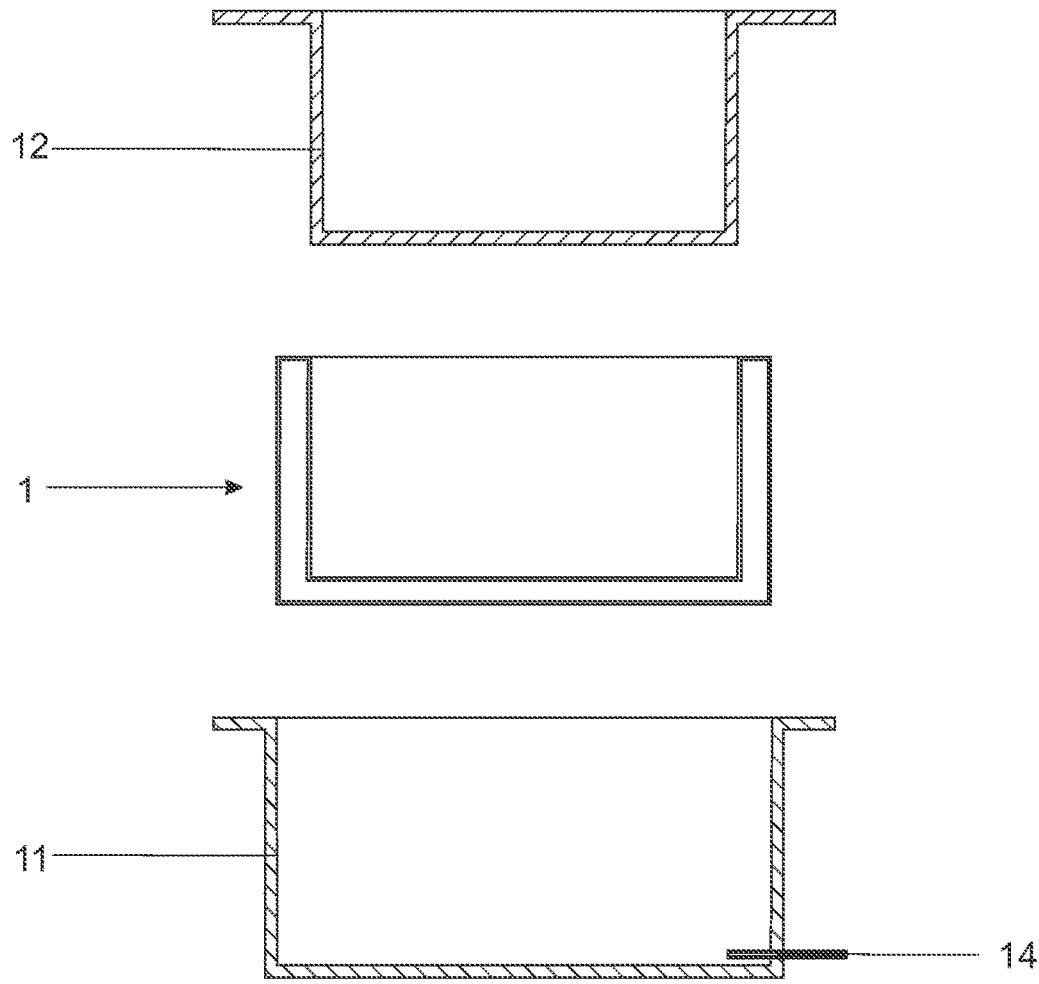
FIG. 3 is a diagrammatic sectional illustration of the mould disassembled and the moulded product released therefrom.

The product is made by a rotational moulding process in which the double walled container forms a first plastic part which is moulded initially using an outer mould half (11) and an inner mould half (12) with a suitable charge of powdered or granular plastic (13) loaded into the outer mould half preparatory to assembling the mould. As shown most clearly in FIG. 2, the container becomes moulded in the usual way.

Figure 5:
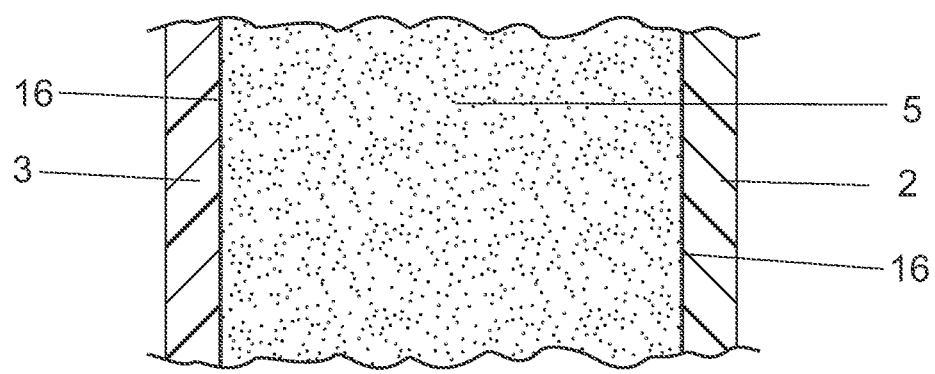

Once the moulding cycle is completed, a predetermined quantity of attachment promoting powder in the form of a diatomaceous earth is introduced into the mould, in this instance, by way of a vent pipe (14) using any convenient expedient such as a metal lance (15) and compressed air. In this way a continuous or discontinuous layer (16) (see FIG. 5) of attachment promoting powder is formed.

This preferably takes place at the stage of full powder melt in the moulding cycle when the inner surface of the moulded plastic within the container is in a liquid or plastic state so that the diatomaceous earth can partially absorb or adsorb plastic material and thereby become attached to the plastic. The molten thermoplastic substrate provides a suitably sticky surface to which the powder can attach and the attachment is not impaired when the plastic cools down. Any appropriate measures may be taken to ensure that the diatomaceous earth becomes substantially distributed over the inside surface of the container shell whilst the inner surface is sufficiently liquid or plastic to bond to the powder. Distribution of the powder may be made during biaxial rotation of the mould.

It is believed that distribution and attachment is assisted by static charges that tend to be present on the molten inner surface of the thermoplastic moulding with the charge attracting the powder particles. Such static charges may be generated by friction between the non-conductive polymer powder or granular particles during handling and mixing. These plastics tend to maintain static charges for extended periods of time to the extent that measures are commonly put in place to neutralise the surface static charge on plastic products and thereby diminish their propensity to attract dust and airborne contaminants.

A predetermined quantity of a two component premix of a suitable polyurethane was used for forming the second plastic part being a core of foam thermosetting resin within the double walled container that forms the first plastic part so that a heat insulating foam is generated to fill the entire cavity between the inner and outer shells of the container. This is carried out such that the polyurethane foam is in contact with the inner surface of the moulded container, these surfaces thereby forming the contact surfaces mentioned above between the two parts.

The quantity of diatomaceous earth used can vary widely but experiments have indicated that approximately 60 ml of diatomaceous earth would be adequate for each square meter of surface to be covered. It has been noted that the quantity of diatomaceous earth powder is preferably sufficient to matt the hot plastic surface in order to be effective and that the molten plastic is too viscous to be wicked into the diatomaceous earth layer.

In experiments that have been conducted to date, the polyurethane foam used was supplied by AEROTHANE APPLICATIONS (PTY) LTD of Cape Town, South Africa. It is a standard two part foaming system providing a target core density of about 35 kg per cubic meter; a compression strength of about 200 kPa; a closed cell content of at least 95%; and water absorption by volume of less than 2.5%. The foam uses a water blowing agent to produce carbon dioxide ($CO_2$). The reaction profile is claimed to be; cream time 60-70 seconds; rise time 240-300 seconds; and tack free time 270-300 seconds.

Where the foaming process is pressurized, the foam generally forms a solid layer or skin over the contact surface and contacting the layer of attachment promoting powder. It has been noted that even in an unpressurised foaming process the bubbles cling aggressively to the attachment promoting powder. Experimentation has shown that any reasonable excess of diatomaceous earth on the plastic substrate is apparently absorbed by the polyurethane foam and generally attachment will not be impaired.

Many existing two part thermosetting polyurethane foams use water as a foaming agent. The contact surface includes exposed surfaces of the particles of diatomaceous earth and the polyurethane plastic contacts the particles as the polyurethane foam is formed. It is believed that some polyurethane may become at least partially absorbed or adsorbed into or onto the diatomaceous earth particles such that it attaches to the particles. The diatomaceous earth thereby exhibits the characteristic of bonding to the inner surface of the polyethylene plastic of the first part, being the container inner and outer shells and, when the second part in the form of the foam polyurethane core is moulded into the shell, bonding to the plastic of the second part. The diatomaceous earth particles thus appear to form a mechanical attachment to both of the plastics to firmly attach them together.

The diatomaceous earth used in the tests that have been conducted to date is Dicalite 4500 marketed by DICALITE, DICAPERL MINERALS, INC of Pennsylvania in the USA. It is stated to be a white, flux-calcined diatomaceous earth primarily used as a filter aid and possesses a claimed bulk density of 370 kgs/cubic meter; a median particle density (MDP um) of 64; and a moisture contact of less than 0.5%.

As indicated above, the mechanism of the attachment of diatomaceous earth to both of the two dissimilar plastics is not fully understood but is considered to be consequent on the fact that diatomaceous earth has a high absorption capacity and can absorb or at least adsorb both the polyolefin and the polyurethane, in each instance whilst the plastic is sufficiently fluid. However, it appears that it is a result of mechanical keying and interlocking which is promoted by the high porosity, high surface area and complex surface topography of the particles of attachment promoting diatomaceous earth interlayer.

Other methods of introducing the diatomaceous earth powder into an enclosed rotational moulded product can be employed as will be quite apparent to those skilled in the art. It may be of advantage to use a pressure limiting valve known as a "SUPAVENT" produced by the New Zealand company LA PLASTECNICA.

It is also possible to use any other techniques of introducing a powder into the interior of a rotational moulded article after initial moulding has taken place such as by using a so-called drop-box and optionally one that has a membrane that melts at a predetermined temperature, or a charge holding meltable plastic bag or other expedient that is able to release the powder adequately into the mould at the appropriate time when initial moulding of the outer shell is completed and the plastic on the inner surface is still in a suitably liquid or plastic state.

It will be understood that the invention can be applied to any shape of rotational moulded article and is not in any way restricted to one of the type described above.

Still further, the invention can be applied to other plastic articles where heat is applied to convert thermoplastic granules and powders to form other such articles by other methods including but not limited to blow moulding and extrusion of sheet materials.

It is envisaged that the invention may particularly apply to the co-extrusion or over-extrusion of two different plastics that may tend not to adhere to each other adequately in the normal course of events, and in such an instance it is postulated that it will be possible to introduce a continuous or discontinuous layer of attachment promoting powder between two co-extruded or over-extruded layers during the extrusion process. Co-extrusions are typically produced in order to provide a tubular starting material for the blow moulding of numerous different products, including, but not limited to, containers and tanks such as solar water heater tanks and other water storage tanks.

Still further, the invention can be applied to other types of thermosetting plastics and is not in any way restricted to the foam polyurethane filler type of filler described above.

Numerous variations may thus be made to the embodiment of the invention described above without departing from the scope hereof.

The invention claimed is:

1. A plastics moulding process in which a first part is moulded and a second part is moulded such that at least a part of its surface is in contact with a surface of the first part during the moulding process with the surfaces that are in contact forming contact surfaces between the two parts, wherein the first part is moulded firstly and, whilst at least the contact surface is still in a liquid or plastic state, applying to at least a part of the contact surface an attachment promoting powder which is a suitable grade of diatomaceous earth that has the characteristic of attaching to the plastic of the first part by absorbing or adsorbing some of the plastic of the first part to form a continuous or discontinuous layer thereof on the contact surface of the first part, and thereafter moulding the second part so as to contact the first part at the contact surfaces such that the plastic of the second part attaches, before or as it solidifies, to the continuous or discontinuous layer of the attachment promoting powder by absorption or adsorption of some of the plastic of the second part by the attachment promoting powder and thereby attaching the second part to the first part with the attachment promoting powder forming a continuous or discontinuous interlayer over the contact surface between the plastic of the first part and the plastic of the second part.

2. A plastics moulding process as claimed in claim 1 in which the first part is of a thermoplastic material and the second part is of a thermosetting plastic.

3. A plastics moulding process as claimed in claim 1 in which the first part is hollow and is made by a rotational moulding process and, when the first part has been substantially formed, the attachment promoting powder is released into the interior of the first part such that it becomes substantially distributed over the contact surface of the first part whilst the inner surface thereof is sufficiently liquid or plastic to attach to the attachment promoting powder.

4. A plastics moulding process as claimed in claim 3 in which the second part is a plastic foam for filling for a hollow first part.

5. A plastics moulding process as claimed in claim 4 in which the first part is made of a thermoplastic polyolefin and the foam filling is thermosetting polyurethane.

6. A plastics moulding process as claimed in claim 3 in which the first part is made by rotational moulding and the attachment promoting powder is introduced into the hollow first part using a lance introduced into a vent pipe and the powder is blown into the hollow first part using compressed air.

7. A plastics moulding process as claimed in claim 3 in which the first part is made by rotational moulding and the attachment promoting powder is released into the interior of the hollow first part using a dropbox.

8. A plastics moulding process as claimed in claim 3 in which the first part is made by rotational moulding and the attachment promoting powder is released into the interior of the hollow first part using a bag that melts at a predetermined temperature commensurate with the attainment of a liquid or plastic state of the inner surface of the first part.

* * * * *